United States Patent

Tsujikawa et al.

Patent Number: 6,130,728
Date of Patent: Oct. 10, 2000

[54] SINGLE PANEL COLOR PROJECTION LCD HAVING A PLURALITY OF REFLECTORS

[75] Inventors: Susumu Tsujikawa; Yukio Ogura, both of Tokyo, Japan

[73] Assignee: NEC Corporation, Tokyo, Japan

[21] Appl. No.: 08/915,116

[22] Filed: Aug. 20, 1997

[30] Foreign Application Priority Data

Aug. 20, 1996 [JP] Japan ................................. 8-218348

[51] Int. Cl.[7] .......................... G02F 1/1335; G02B 1/10
[52] U.S. Cl. .................................. 349/9; 349/5; 359/487
[58] Field of Search ............................... 349/9, 95, 117, 349/5; 359/487

[56] References Cited

U.S. PATENT DOCUMENTS

| | | | |
|---|---|---|---|
| 5,042,921 | 8/1991 | Sato et al. | 349/9 |
| 5,052,783 | 10/1991 | Hamada | 349/5 |
| 5,278,680 | 1/1994 | Karasawa et al. | 349/9 |
| 5,555,186 | 9/1996 | Shioya | 349/9 |
| 5,717,742 | 2/1998 | Lee | 349/9 |
| 5,729,306 | 3/1998 | Miyake et al. | 349/9 |
| 5,748,369 | 5/1998 | Yokota et al. | 359/487 |
| 5,812,223 | 9/1998 | Noguchi | 349/9 |

FOREIGN PATENT DOCUMENTS

| | | |
|---|---|---|
| 3-208013 | 9/1991 | Japan . |
| 460538 | 2/1992 | Japan . |

*Primary Examiner*—William L. Sikes
*Assistant Examiner*—Toan Ton
*Attorney, Agent, or Firm*—Sughrue, Mion, Zinn, Macpeak & Seas, PLLC

[57] ABSTRACT

In a single panel color projection LCD, white light emitted from a light source is optically processed by an optical processing unit so as to convert three primary color beams obtained from the white light into predetermined polarized beams. All of the predetermined polarized beams may be P-polarized beams or S-polarized beams. Thereafter, the optical processing unit irradiates only the predetermined polarized beams onto the liquid crystal panel without an optical power loss. A color image which is given by the liquid crystal panel is projected onto a screen to be displayed in an enlarged form.

18 Claims, 4 Drawing Sheets

SINGLE PANEL COLOR PROJECTION LCD HAVING A PLURALITY OF REFLECTORS

BACKGROUND OF THE INVENTION

This invention relates to a single panel color projection liquid crystal display (called, a single panel color projection LCD hereinafter) to project onto a screen a color image given by a color liquid crystal panel and to thereby display an enlarged color picture on the screen. In particular, this invention relates to a single panel color projection LCD which is for use in combination with a personal computer, a TV set, a VCR, and so on.

Color projection LCDs can be classified into two types, a single panel color projection LCD having one liquid crystal panel and a triple panel color projection LCD having three liquid crystal panels.

Roughly speaking, the triple panel color projection LCD displays an image as follows. Light emitted from a white light source is separated into three primary color beams, namely, red, green, and blue beams or rays by the use of dichroic mirrors. The three color beams are irradiated onto three liquid crystal panels corresponding to the colors of the color beams. Then, the light beams passing through the panels are optically compounded and projected onto a screen. Thus, the LCD displays an enlarged picture of the image from optical input devices, such as a personal computer and a TV set. Though the triple panel color projection LCD has a good optical efficiency and produces higher image resolution, it is more complex and larger in structure of the optical system and more expensive than the single panel color projection LCD.

On the other hand, the single panel color projection LCD is more advantageous than the triple panel color projection LCD with regard to size and cost performance.

Taking this into consideration, description will be made only about the single panel color projection LCD. Specifically, such an LCD basically comprises a liquid crystal panel having color filters corresponding to each of the three color beams and serves to display a color image in a liquid crystal panel and to project an enlarged color image on a screen. Such an LCD is advantageous in compactness and inexpensiveness.

However, this type of LCD has a following problem. In the liquid crystal panel, the color filters absorb about two-thirds of each light beams irradiated to the panel, and therefore, the single panel color projection LCD can effectively utilize only about one-third of the irradiated light beams to project an image.

A conventional technique to solve the above-mentioned problem is disclosed in Japanese Unexamined Patent Publication (JP-A) No. 60538/92. The conventional LCD comprises three dichroic mirrors and a liquid crystal panel. In detail, a predetermined arrangement of the dichroic mirrors makes it possible to separate light from a white light source into the three primary color beams—blue, red, and green beams, and irradiate the primary color separated beams onto the liquid crystal panel. The liquid crystal panel including a microlens array, converges each primary color beam irradiated by each dichroic mirror into different pixels of the liquid crystal panel. Each color beam passing through each pixel is optically compounded, and forms a color image on a screen.

A conventional LCD of the type described can project a picture of a color image onto a screen by the use of a combination of the three dichroic mirrors and the liquid crystal panel. In this case, since the liquid crystal panel requires no color filter, the absence of the optical power loss caused by the color filter enables the efficient use of light from a light source.

However, the conventional LCD still has a difficulty to display a bright image.

In case of the above-mentioned LCD, the three dichroic mirrors separate light from a light source into the three primary color beams—blue, green, and red beams, by selecting particular wavelengths corresponding to the three primary colors. Though the three primary color beams irradiated from the three dichroic mirrors are substantially natural light, it is necessary that three primary color beams irradiated to the liquid crystal panel are linearly polarized light. Therefore, the color separate beams irradiated from the dichroic mirrors to the liquid crystal panel must be polarized by a polarizer positioned between the three dichroic mirrors and the crystal panel.

However, only a small portion of the color separated beams is polarized, while most amount of the color beams remains natural light.

Generally, when natural light is irradiated, a polarizer selects only linearly polarized light by passing either P-polarized or S-polarized light through and by reflecting or absorbing the unselected polarized light.

Consequently, the light irradiated on the liquid crystal panel has approximately a half of the optical power, compared with the light emitted by a light source. This is why the polarizer causes the loss of the optical power by absorbing or reflecting either of two kinds of the polarized components included in the light emitted by the light source. In case of this conventional single panel LCD, the loss caused by the polarizer is unavoidable with respect to its structure. As a result, it is difficult for the conventional LCD to display a bright color image.

Moreover, consideration may be made about using a high power light source to compensate for the optical power loss. However, such compensation for the optical power loss by the use of the high power light source leads to a following problem. As is known well in the art, heat is generated when a polarizer absorbs light. The heat generated by the absorption of light heats the polarizer. In case of a large quantity of heat, it lowers the polarizer's performance. Therefore, it is preferable that the polarizer absorbs as small optical power as possible. From this point of view, the conventional LCD cannot employ a high power light source to make up for the optical power loss. As a result, the conventional LCD is difficult to display a bright color image.

SUMMARY OF THE INVENTION

It is an object of this invention to provide a color projection LCD which has great optical efficiency in utilizing light from a light source and can display a bright color image.

According to this invention, there is provided a color projection LCD, comprising a light source; a liquid crystal panel; and a means located between the light source and the liquid crystal panel for optically separating light from the light source into the three primary color beams and irradiating the color separate beams onto the liquid crystal panel by converting all of the color beams into either P-polarized or S-polarized beams in order to substantially maintain the optical power.

It can be understood from its structure that this invented color projection color LCD can display a luminous image because the color projection LCD efficiently utilizes both P-polarized and S-polarized components of the light from the light source.

DESCRIPTION OF THE PREFERRED EMBODIMENT

Prior to description of embodiments of the present invention, a conventional color projection LCD will be described for a better understanding of the present invention.

Figure 1:
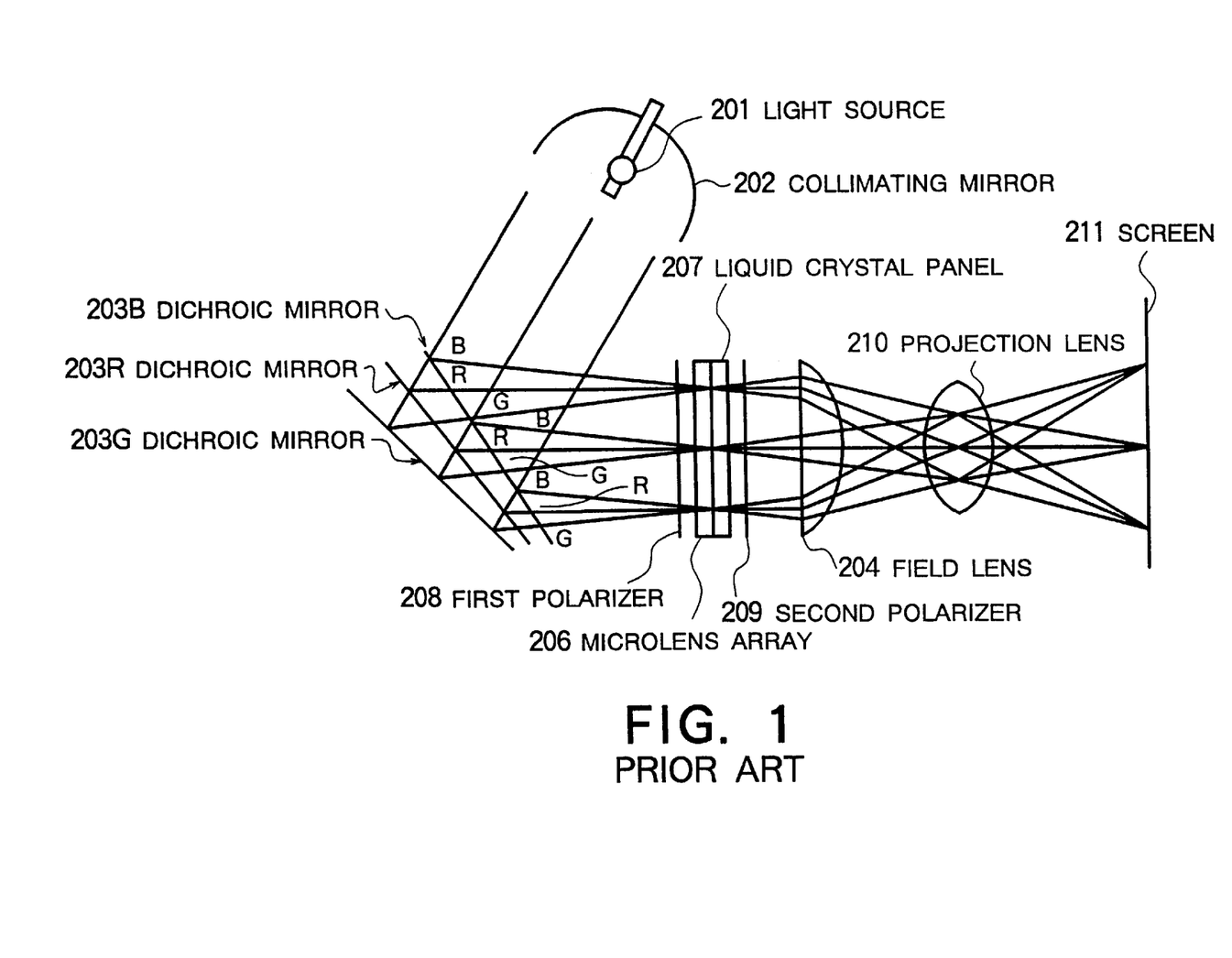
FIG. 1 shows a conventional color projection LCD.

Referring to FIG. 1, the conventional color projection LCD comprises a light source 201 to emit light, a collimating mirror 202, such as a parabolic reflector, to collimate the light from the light source, three dichroic mirrors 203B, 203R, and 203G, corresponding to a blue beam, a red beam, and a green beam respectively, a first polarizer 208, a microlens array 206, a liquid crystal panel 207, a second polarizer 209, a field lens 204, and a projection lens 210.

White light from the light source 201 is collimated by the collimating mirror 202 into collimated light and incident onto the three dichroic mirrors 203B, 203R, and 203G. The three dichroic mirrors 203B, 203R, and 203G, are arranged with the surfaces of the mirrors kept at different angles to an optical axis of the collimated light.

The three dichroic mirrors 203B, 203R, and 203G, individually reflect a blue beam, a red beam, and a green beam of the collimated light since each dichroic mirror reflects only a color beam of a particular wavelength, and passes through the remaining color beams of the other wavelengths. Therefore, the white light is separated into the three primary color beams by the reflection on the three dichroic mirrors 203B, 203R, and 203G. Each beam of the primary color beam reflected by the three dichroic mirrors 203B, 203R, and 203G passes through the first polarizer 208, and is introduced onto the microlens array 206 at a different incident angle. The color separate beams incident onto the microlens array 206, are focused by lenses of the microlens array 206 on different positions of the liquid crystal panel 207. At the respective positions, different pixels are arranged for the individual color beams on the liquid crystal panel 207. In other words, each pixel of the liquid crystal panel 207 is arranged to receive only one primary color beam from the microlens array 206. Thus, a color image can be displayed on a screen 211 with no color filter by allowing the color separate beams to pass through the respective pixels and by optically combining them together.

In case of the above-mentioned conventional LCD, no optical power is absorbed by a color filter because the liquid crystal panel 207 has no color filter.

However, the color separate beams must be linearly polarized by the first polarizer 208 positioned prior to the liquid crystal panel 207, this is because the color beams reflected by the three dichroic mirrors 203B, 203R, and 203G still remain natural light.

With this structure, the color beams lose about a half of the optical power when it is linearly polarized by the first polarizer 208. In case of the conventional LCD, the loss of the optical power is therefore unavoidable in the illustrated structure. This makes it difficult to display a bright image, as mentioned in the preamble of the instant specification.

Now, description is made about a color projection LCD according to the first embodiment of this invention with reference to FIGS. 2 and 3A–3C.

Figure 2:
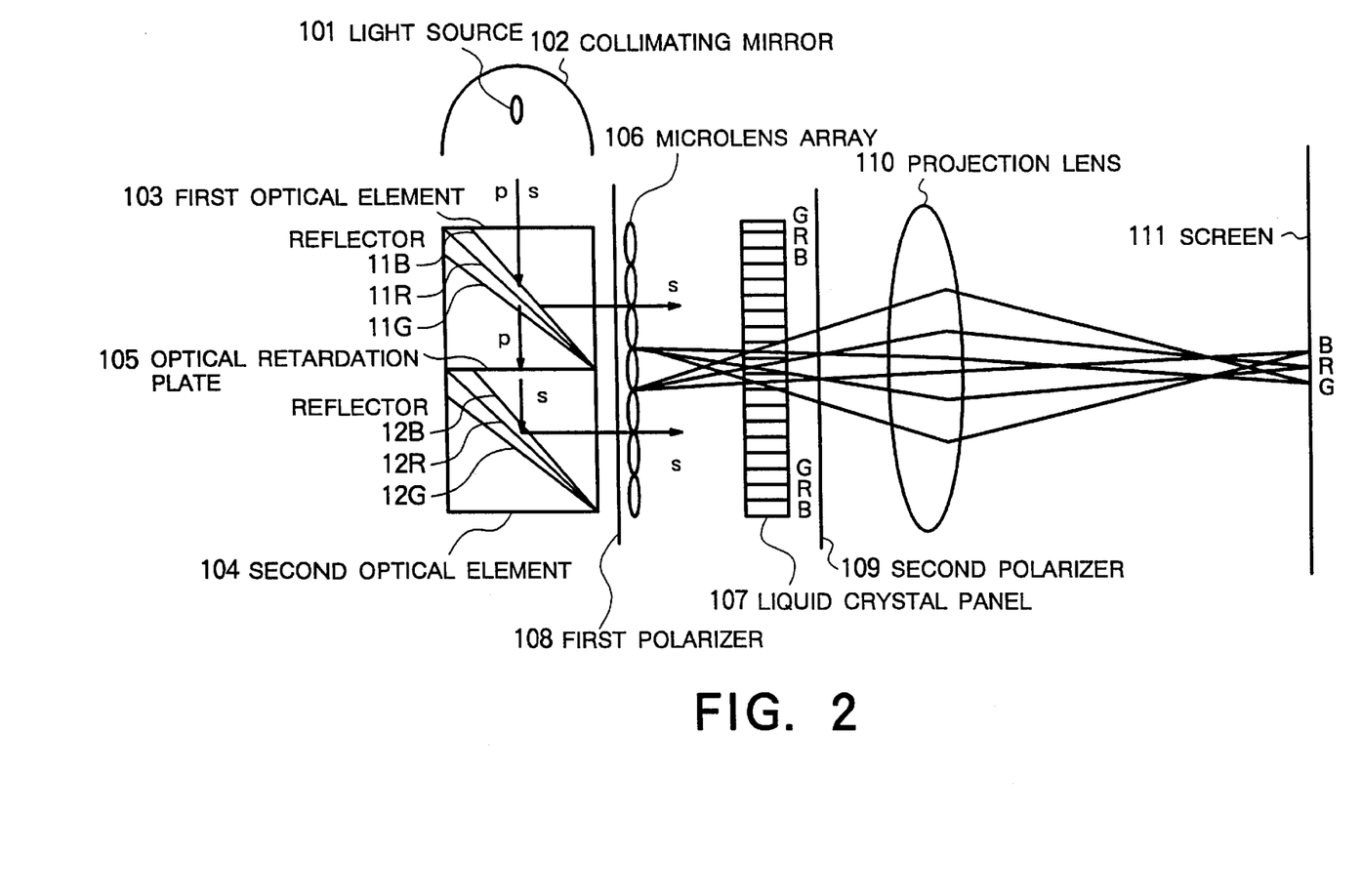
FIG. 2 shows a color projection LCD according to a first embodiment of the present invention.

Referring to FIG. 2, the color projection LCD according to the first embodiment of the present invention comprises a light source 101, a collimating mirror 102, a first optical element 103 (will be described later), an optical retardation plate or a phase shifter 105, a second optical element 104, a first polarizer 108, a microlens array 106, a liquid crystal panel 107, a second polarizer 109, and a projection lens 110.

The white light emitted from the light source 101 is reflected by the collimating mirror 102 to be rendered into collimated light. The collimated light is incident onto the first optical element 103. The first optical element 103 separates or splits the collimated light into the three primary color beams—blue, red, and green beams. At the same time, first optical element 103 passes P-polarized components of the color separate beams through, and reflects only S-polarized components of the color beams onto the liquid crystal panel 107.

In this event, the P-polarized components of the color beams, which are transmitted through the first optical element 103, are given to the optical retardation plate 105 to be converted into S-polarized components. This means that the optical retardation plate 105 serves to rotate each plane of polarization of the irradiated color beams by an angle of 90 degrees.

The S-polarized components are incident on the second optical element 104 after passage of the optical retardation plate 105. The second optical element 104 reflects the beams towards the liquid crystal panel 107. As a result, the blue, red, and green color beams of the light reflected by the first optical element 103 and the second optical element 104 are sent to the microlens array 106 through the first polarizer 108. In this case, each color beam is incident onto the microlens array 106 at a different incident angle.

It should be noticed here that the color beams directed to the first polarizer 108 are all S-polarized color beams. Therefore, the color beams from the light source 101 are sent to the microlens array 106 through the first polarizer 108 without substantial attenuation because the first polarizer 108 is set up to pass only S-polarized components of the color beams.

The color beams reaching the microlens array 106 at different incident angles are converged into different pixels of the liquid crystal panel 107.

As described above, each pixel of the liquid crystal panel 107 is arranged to receive only one of the three primary color beams. Consequently, red, blue, and green beams are delivered to red, blue, and green pixels, respectively. The projection lens 110 converges the color beams transmitted through the second polarizer 109 and projects the light onto the screen 111. In this event, no consideration is made about an optical power loss, as will be described later in detail. Therefore, an enlarged color image is projected to the screen 111 without any color filters.

As mentioned above, the color projection LCD according to the first embodiment of the present invention can avoid the optical power loss caused by a color filter like the conventional color projection LCD, and furthermore can avoid the optical power loss caused by a polarizer positioned before the liquid crystal panel. Therefore, the color projection LCD according to the first embodiment of the present invention has two times optical efficiency, as compared with the conventional color projection LCD.

Now, specific description will be made about each element of the color projection LCD illustrated in FIG. 2.

A metal halide lump of 250 watts may be employed as the light source 101. Instead, white light sources of high brightness, such as a xenon lamp and a halogen lamp may be available as the light source 101.

The collimating mirror 102 may be a parabolic mirror which is formed by a parabolic glass substrate and a reflection layer coated on the surface of the parabolic glass substrate. The reflection layer may be made of a metal such as aluminum or chromium.

Alternatively, the reflection layer may be formed by a cold mirror which is a multilayer of dielectric films formed by vapor deposition on the surface of the parabolic glass substrate. Such a mirror is faced towards the light source 101. The parabolic mirror of the multilayer structure removes infrared light from the light emitted from the light source 101.

A spherical mirror, an ellipsoidal mirror, and an aspherical mirror may be used as the collimating mirror 102.

Furthermore, the collimating mirror 102 may be a combination of a mirror of a parabolic shape, a condenser lens, a slit or a pinhole, and a collimating lens. In such a collimating mirror 102 of the combination type, the mirror reflects white light from the light source 101 onto the condenser lens to focus the reflected light on the slit or the pinhole in order to eliminate unnecessary components of the focused light. Thereafter, the focused light is incident through the slit or the pinhole onto the collimating lens to be rendered into collimated light.

Next, the following description will be directed to about the elements 103, 104, and 105 which serve to separate white light from the light source 101 into the three primary color beams, to convert the color separate beams into S-polarized beams without any optical loss, and to irradiate the polarized beams onto the liquid crystal panel 107. Such a combination of the elements 103, 104, and 105 may be referred to as a polarizing unit.

The polarizing unit comprises the first optical element 103, the second optical element 104, and the optical retardation plate 105, as mentioned before. The first optical element 103 comprises three reflectors 11B, 11R, and 11G, corresponding to blue, red, and green beams respectively. The reflector 11B positioned closest to the light source 101 receives light from the light source 101, reflects only S-polarized component of the blue beam of the light to the liquid crystal panel 107, and transmits P-polarized components of the blue beam and both polarized components of the other color beams of the light. The reflector 11R positioned in the middle receives the light through the reflector 11B and reflects only the S-polarized component of the red beam of the light to the liquid crystal panel 107, and transmits the P-polarized components of the blue and red beams and the both polarized components of the green beam of the light. The reflector 11G positioned farthest from the light source 101 receives the light passing through the reflector 11R, reflects only the S-polarized component of the green beam of the light to the liquid crystal panel 107, and transmits the P-polarized components of the three primary color beams.

The three reflectors 11B, 11R, and 11G have surfaces arranged in order at different angles to the optical axis of the parallel light given from the collimating mirror 102. Consequently, the three color separate beams reflected by the three reflectors 11B, 11R, and 11G are directed towards the microlens array 106 at slightly different angles through the first polarizer 108.

As described above, the white light from the light source 101 is optically separated into the three primary color beams by the three reflectors 11B, 11R, and 11G. The S-polarized components of the blue, red, and green beams of the light reflected by the three reflectors 11B, 11R, and 11G, are given to the microlens array 106 at the different angles, and the P-polarized components of the three color beams are sent to the optical retardation plate 105 through the three reflectors 11B, 11R, and 11G.

Figure 3A:
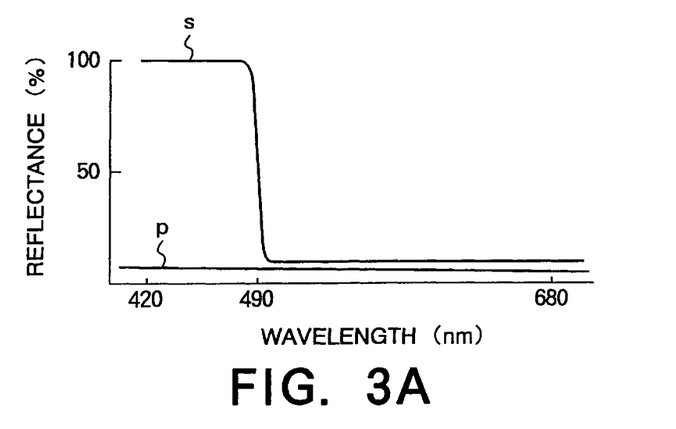
FIGS. 3A–3C shows spectral properties of reflection of reflectors which are comprised in the color projection LCD in accordance with the first embodiment of the present invention.
Figure 3B:
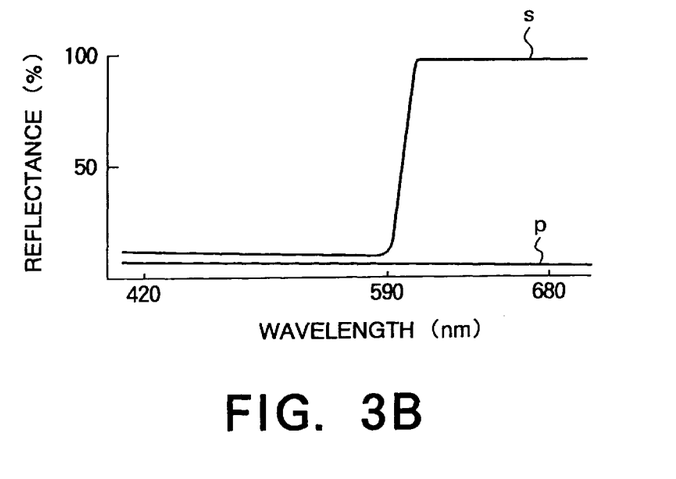
Figure 3C:
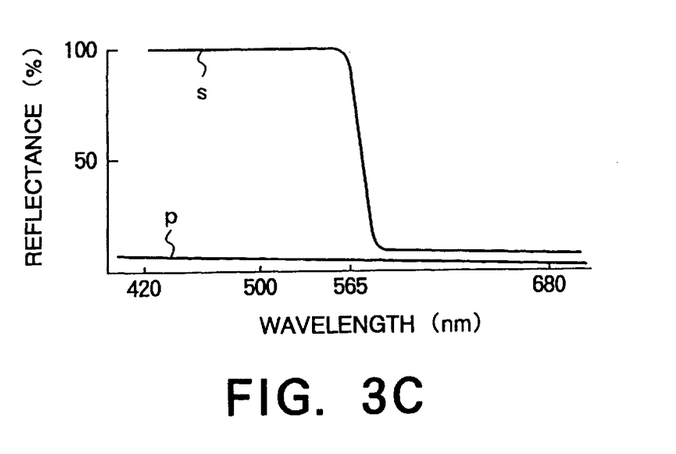

FIGS. 3A, 3B, and 3C show the spectral properties of reflection of the three reflectors 11B, 11R, and 11G. In FIGS. 3A, 3B, and 3C, each abscissa represents a wavelength, and while each ordinate represents a reflectance. In FIGS. 3A, 3B, and 3C, "p" and "s" represent P-polarized light and S-polarized light, respectively. In accordance with the first embodiment of the present invention, a bandwidth of a blue beam ranges from 420 to 490 nm, a bandwidth of a green beam ranges from 500 to 565 nm, and a bandwidth of a red beam ranges from 590 to 680 nm.

In FIG. 3A, it is readily understood that the reflector 11B has a property to selectively reflect only S-polarized component of the blue beam and to transmit the P-polarized component of the blue beam and P- and S-polarized components of the red and the green beams.

In FIG. 3B, it is understood that the reflector 11R has a property to reflect the S-polarized component of the red beam and to transmit the P-polarized components of the blue and the red beams and both polarized components of the green beam. FIG. 3B also shows that the reflector 11R has a property to pass the S-polarized component of the blue beam.

However, the property of the reflector 11R does not cause any problem since the S-polarized component of the blue beam is previously reflected by the reflector 11B and never reaches to the reflector 11R. With respect to cost performance, the reflector 11R may have a property to reflect the S-polarized components of the blue and the red beams and pass the both polarized components of the green beam.

In reference to FIG. 3C, the reflector 11G has a property to reflect the S-polarized component of the green beam and pass or transmit the P-polarized components of the three primary color beams. FIG. 3C also shows that the reflector 11G has a property to reflect the S-polarized component of the blue beam and to pass both polarized components of the red beam.

Like in the reflector 11R, the property of the reflector 11G does not cause any problem since prior to the reflector 11G, the S-polarized component of the blue beam is reflected by the reflector 11B and the S-polarized component of the red beam is reflected by the reflector 11R. This means that the S-polarized components of the blue and the red beams never reaches to the reflector 11G. Therefore, the reflector 11G may have a property to reflect the S-polarized components of the blue and red beams with respect to cost performance.

The optical retardation plate 105 may have a predetermined birefringence effect by a uniaxial stretched polycarbonate film. The optical retardation plate 105 is made or structured in order that a phase difference between incoming light onto the optical retardation plate 105 and outgoing light from the optical retardation plate 105 becomes equal to a half wavelength of the light. Thus, the P-polarized light coming into the optical retardation plate 105 is converted to S-polarized light by the optical retardation plate 105, and thereafter, the S-polarized light is irradiated onto the second optical element 104.

Furthermore, the same element as the first optical element 103 is utilized for the second optical element 104 in accordance with the first embodiment of the present invention. In other words, the second optical element 104 comprises three reflectors 12B, 12R, and 12G, all of which function like the three reflectors 11B, 11R, and 11G, in the first optical element 103. Therefore, the three reflectors 12B, 12R, and 12G, separate the S-polarized light from the optical retardation plate 105 into the three primary color beams and irradiate the color separate beams to the microlens array 106 at each predetermined angle of reflection in the same way as the three reflectors 11B, 11R, and 11G separate and irradiate the color beams to the microlens array 106.

Particularly, each of the first and the second optical elements 103 and 104 according to the first embodiment of the invention has a transparent and rectangular body. Each length of the element mainly depends on the size of the liquid crystal panel 107. The optical retardation plate 105 is fixed between the first optical element 103 and the second optical element 104. The first and the second optical elements 103 and 104 according to the first embodiment of this invention are made of BK7, but other materials are applicable for the first and second optical elements 103 and 104 as long as the materials maintain the reflective properties shown in FIG. 3A–3C.

In addition, the second optical element 104 has thus far been described above on the assumption that it is the same as the first optical element 103. However, the first and the second optical elements 103 and 104 may not be always identical with each other.

An axis of the light transmission of the first polarizer 108 is determined so that the S-polarized light beam can be transmitted. In this case, the first polarizer 108 is manufactured through following steps. At first, iodine is doped on a polymer film applied with polyvinyl alcohol. Then, the iodine doped polymer film is uniaxially stretched. At the same time, a major axis of iodine distributed on the iodine doped polymer film is turned to a direction of the uniaxial stretch. The first polarizer 108 is manufactured through the aforesaid process. In this case, light vibrating perpendicularly to the major axis of iodine almost passes through the first polarizer 108, while light vibrating horizontally to the long axes of iodine is almost absorbed by iodine on the first polarizer 108 instead of passing through the first polarizer 108. As a result, the light passing through the first polarizer 108 is rendered into turns to be linearly polarized light.

The microlens array 106 comprises tiny convex lenses arranged on the face of the array in the ratio of one lens of the microlens array 106 to three pixels of the liquid crystal panel 107 which correspond to red, green, and blue colors. The convex lens of the microlens array 106 functions in dependency upon distribution of a refractive index formed by selective ion exchange. In addition to the selective ion exchange, molding of a plastic or glass substrate is also well known in the art as the way to form the microlens array 106. Either way is applicable to forming the microlens array 106.

The liquid crystal panel 107 is manufactured by enclosing liquid crystal with an opening between two glass substrates having transparent electrode films to form pixels. In this embodiment of the present invention, twisted nematic (TN) liquid crystal is used. In each pixel, a change of alignment of the liquid crystal caused by applied voltage varies a condition of polarized light coming into pixels. Changing the condition of the polarization in response to the alignment of the liquid crystal, only one predetermined component of the polarized light passing through each pixel is chosen by the second polarizer 109, and thereafter is directed to the screen 111. An active matrix system is employed as a driving system of the liquid crystal. The active matrix system comprises in each pixel a thin film transistor (TFT) functioning as a switching element and drives the liquid crystal by switching on/off the TFT. In accordance with the first embodiment of the present invention, the TN liquid crystal is used as the liquid crystal in the liquid crystal panel 107. However, other liquid crystal such as super twisted nematic (STN) liquid crystal, ferroelectric liquid crystal, and electrically controlled birefringence liquid crystal are also applicable to the liquid crystal panel 107. With regard to the driving system of the liquid crystal, a simple matrix system having time-divisional drive is substituted for the active matrix system.

The second polarizer 109 has the same structure as the first polarizer 108. Specifically, the second polarizer 109 is arranged so that an axis of light transmission of the second polarizer 109 becomes parallel to that of light transmission of the first polarizer 108. In accordance with the first embodiment of this invention, if a voltage is not applied to the pixels in the liquid crystal panel 107, the second polarizer 109 shuts off the light through the pixels since the liquid crystal panel 107 is a type of TN. Therefore, the color projection LCD according to the embodiment of the present invention is a normally black type.

Alternatively, the second polarizer 109 may be arranged so that the axis of light transmission of the second polarizer 109 is perpendicular to that of light transmission of the first polarizer 108. In this case, the color projection LCD is a normally white type.

The projection lens 110 projects onto the screen 110 a color image given by the liquid crystal panel 107. In the embodiment of this invention, the projection lens 110 is attached to a focus adjustment mechanism for adjusting a focal point. The projection lens 110 may be attached to a zoom mechanism for varying the size of the picture of the color image without modifying the projection distance.

In FIG. 2, nothing is installed between the second polarizer 109 and the projection lens 110 in the color projection LCD according to the first embodiment of this invention. However, as shown in FIG. 1, the color projection LCD may include a field lens between the second polarizer 109 and the projection lens 110 in order to obtain high efficiency to gather light.

As described above, the color projection LCD according to the first embodiment of the present invention comprises the polarizing optical unit to separate light, having the first and the second optical elements 103 and 104, and the optical retardation plate 105. Thus, the polarizing optical unit separates light from the light source 101 into the three primary color P-polarized beams and the three primary color S-polarized beams, and controls both of the color polarized beams by converting either the P-polarized beams or the S-polarized beams into the same polarization of the unconverted beams, then irradiates the three color synchronized beams to the liquid crystal panel 107. Consequently, the optical power of the light from the light source 101 is substantially maintained. Therefore, the color projection LCD according to the first embodiment of this invention basically obtains the optical efficiency of almost 100 percent which is twice as much as the optical efficiency of the conventional color projection LCD. Light which is directed onto the first polarizer 108 is linearly polarized since the light is irradiated by the aforementioned polarizing optical unit. Thus, the first polarizer 108 hardly absorbs light and generates heat so that the optical power loss mentioned in the conventional color projection LCD is hardly caused.

Description is made with FIG. 4 about a color projection LCD according to the second embodiment of the present invention as follows.

Figure 4:
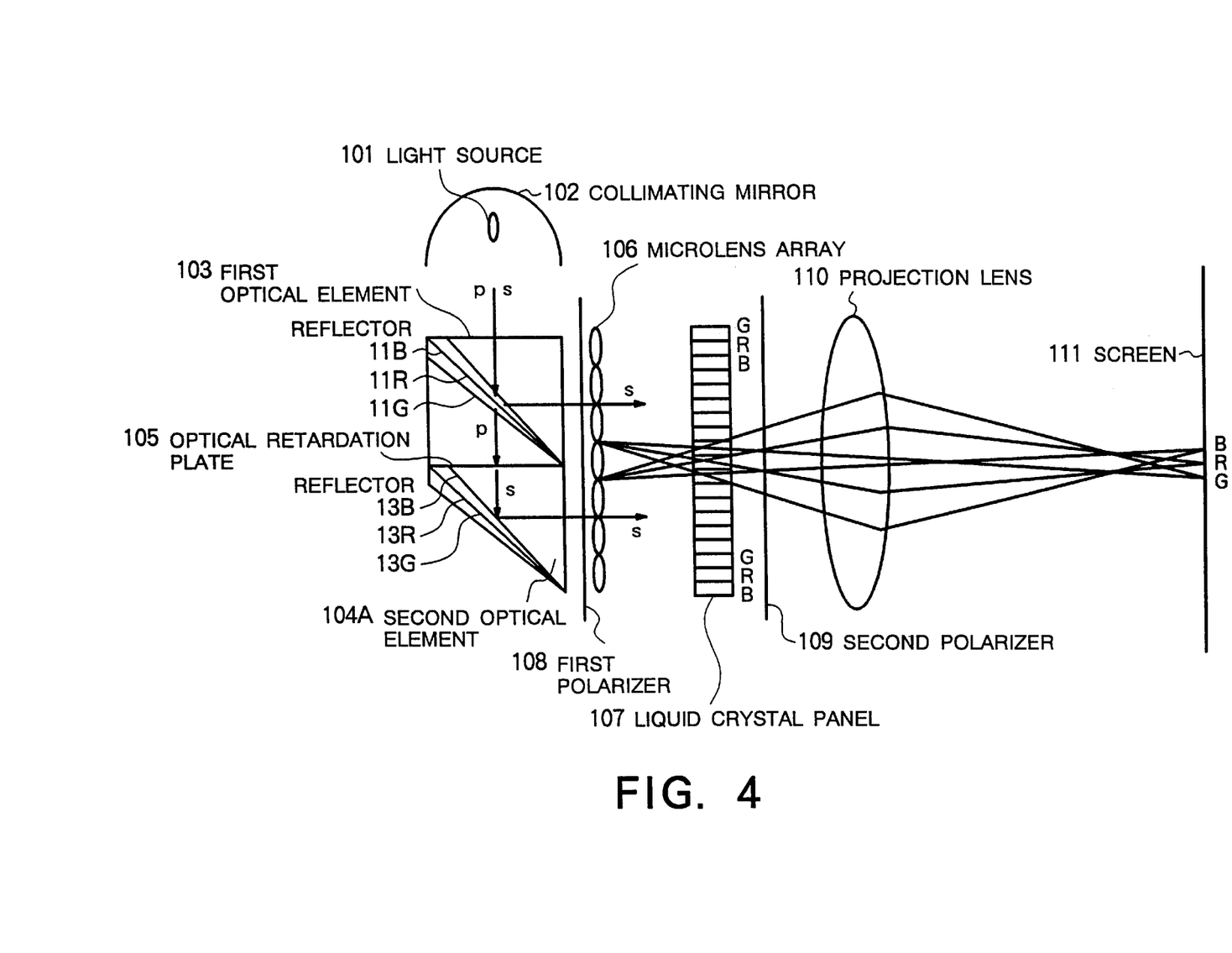
FIG. 4 shows a color projection LCD according to a second embodiment of the present invention.

FIG. 4 shows the color projection LCD according to the second embodiment of this invention. The color projection LCD according to the second embodiment of this invention is a modified version of the color projection LCD according to the first embodiment of this invention. Except for a second optical element 104A in FIG. 4, the color projection LCD according to the second embodiment of this invention has the same structure as the color projection LCD according to the first embodiment of this invention. Therefore, only the second optical element 104A is specifically described as follows.

The employment of the second optical element 104A makes it clear that the color projection LCD according to the second embodiment of this invention is different from the color projection LCD according to the first embodiment of this invention.

As well as the second optical element 104 in FIG. 2, the second optical element 104A comprises three reflectors 13B, 13R, and 13G. However, the three reflectors 13B, 13R, and 13G, which the second optical element 104A comprises, have different spectral properties of reflection from the properties of the three reflectors 12B, 12R, and 12G. The three reflectors 11B, 11R, and 11G, in accordance with the second embodiment of the present invention, which the first optical element 103 comprises, need to have both properties to reflect between S-polarized light and P-polarized light and pass the unselected light through and properties to split light into the three primary color beams. On the other hand, the three reflectors 13B, 13R, and 13G, which the second optical element 104A comprises, do not need to have the properties to reflect between the S-polarized light and the P-polarized light and pass the remaining polarized light through. The second optical element 104A just needs to have a property to split light into the three primary color beams since the light passing through the first optical element 103 and the optical retardation plate 105 is linearly S-polarized before reaching the second optical element 104A. Consequently, the optical system according to the second embodiment of this invention is comparatively easier to design than the optical system according to the first embodiment of the present invention.

As described above, the color projection LCDs according to this invention can obtain very high optical efficiency and produce a bright display.

What is claimed is:

1. A color projection liquid crystal display, comprising:
   a light source for emitting light;
   a liquid crystal panel; and
   optically processing means located between said light source and said liquid crystal panel, for optically processing light from said light source to selectively derive three primary color beams from said light with a plurality of reflectors, to convert all of the three primary color beams into converted polarized beams which are all formed by either P-polarized beams or S-polarized beams, and to irradiate the liquid crystal panel with said converted polarized beams.

2. A color projection liquid crystal display as claimed in claim 1, wherein said optically processing means comprises:

a first optical element for extracting between the P-polarized components and the S-polarized components of the three primary color beams by splitting the light from said light source into the three primary color beams, by reflecting the selected components of said three primary color beams to said liquid crystal panel, and by passing the remaining components therethrough, and polarization converting means for converting the polarized components of the three color beams, which pass through said first optical element, into the same polarization of the components of the three color beams extracted by said first optical element.

3. A color projection liquid crystal display as claimed in claim 2, wherein said polarization converting means comprises:

a polarization converting element for converting the polarized components of the color beams passing through said first optical element into the same polarized components of the color beams reflected by said first optical element; and a second optical element for reflecting the three color beams passing through said polarization converting element onto said liquid crystal panel.

4. A color projection liquid crystal display as claimed in claim 3, wherein:

said first optical element has three of said reflectors having predetermined spectral properties of reflection which correspond to each of the three primary color beams, said reflectors being arranged at different angles to an optical axis of the light from said light source and selectively reflecting the P-polarized components and the S-polarized components of the three primary color beams, with the remaining components of the three primary color beams passed through the reflectors, said second optical element having three of said reflectors having predetermined spectral properties of reflection which correspond to each of the three primary color beams, said reflectors being arranged at different angles to an optical axis of the light from said light source and reflecting the polarized components of the three primary color beams passing through said polarization converting element.

5. A color projection liquid crystal display as claimed in claim 4, wherein said polarization converting element comprises an optical retardation plate.

6. A color projection liquid crystal display as claimed in claim 1, further comprising a microlens array attached to said liquid crystal panel in order to focus the three primary color beams onto predetermined pixels of the liquid crystal panel which correspond to the three primary colors.

7. A color projection liquid crystal display comprising:
   a light source for emitting light which has a predetermined optical power;
   a liquid crystal panel; and
   optically processing means located between said light source and said liquid crystal panel, for optically processing light from said light source to selectively derive three primary color beams from said light by a plurality of reflectors, to convert all of the three primary color beams into converted polarized beams which are all formed by either P-polarized beams or S-polarized beams and which have optical power greater than a half of said predetermined optical power, and to thereafter irradiate the liquid crystal panel with said converted polarized beams.

8. A color projection liquid crystal display as claimed in claim 7, wherein the optical power of the converted polarized beams is substantially equal to said predetermined optical power.

9. A color projection liquid crystal display, comprising:
a light source for emitting light;
a liquid crystal panel; and
optically processing means located between said light source and said liquid crystal panel, for optically processing light from said light source to derive the three primary color beams from said light, to convert all of the three primary color beams into converted polarized beams which are all formed by either P-polarized beams or S-polarized beams, and to irradiate the liquid crystal panel with said converted polarized beams;
wherein said optically processing means comprises:
a first optical element for extracting between the P-polarized components and the S-polarized components of the three primary color beams by splitting the light from said light source into the three primary color beams by reflecting the selected components of said three primary color beams to said liquid crystal panel, and by passing the remaining components therethrough; and
polarization converting means for converting the polarized components of the three color beams, which pass through said first optical element, into the same polarization of the components of the three color beams extracted by said first optical element;
wherein said polarization converting means comprises:
a polarization converting element for converting the polarized components of the color beams passing through said first optical element into the same polarized components of the color beams reflected by said first optical element; and
a second optical element for reflecting the three color beams passing through said polarization converting element onto said liquid crystal panel;
wherein said first optical element has three reflectors having predetermined spectral properties of reflection which correspond to each of the three primary color beams, said reflectors being arranged at different angles to an optical axis of the light from said light source and selectively reflecting the P-polarized components and the S-polarized components of the three primary color beams, with the remaining components of the three primary color beams passed through the reflectors; and
wherein said second optical element having three reflectors having predetermined spectral properties of reflection which correspond to each of the three primary color beams, said reflectors being arranged at different angles to an optical axis of the light from said light source and reflecting the polarized components of the three primary color beams passing through said polarization converting element.

10. A color projection liquid crystal display as claimed in claim 9, wherein said polarization converting element comprises an optical retardation plate.

11. A color projection liquid crystal display, comprising:
a light source for emitting light;
a liquid crystal panel; and
an optical unit located between said light source and said liquid crystal panel, said optical unit processing light from said light source to selectively derive three primary color beams from said light with a plurality of reflectors, to convert all of the three primary color beams into converted polarized beams which are all formed by either P-polarized beams or S-polarized beams, and to irradiate the liquid crystal panel with said converted polarized beams.

12. A color projection liquid crystal display as claimed in claim 11, wherein said optical unit comprises:
a first optical element for extracting between the P-polarized components and the S-polarized components of the three primary color beams by splitting the light from said light source into the three primary color beams, by reflecting the selected components of said three primary color beams to said liquid crystal panel, and by passing the remaining components therethrough; and
a polarization converter to convert the polarized components of the three color beams, which pass through said first optical element, into the same polarization of the components of the three color beams extracted by said first optical element.

13. A color projection liquid crystal display as claimed in claim 11, wherein said polarization converter comprises:
a polarization converting element to convert the polarized components of the color beams passing through said first optical element into the same polarized components of the color beams reflected by said first optical element; and
a second optical element for reflecting the three color beams passing through said polarization converting element onto said liquid crystal panel.

14. A color projection liquid crystal display as claimed in claim 13, wherein:
said first optical element has three reflectors having predetermined spectral properties of reflection which correspond to each of the three primary color beams, said reflectors being arranged at different angles to an optical axis of the light from said light source and selectively reflecting the P-polarized components and the S-polarized components of the three primary color beams, with the remaining components of the three primary color beams passed through the reflectors;
said second optical element having three of said reflectors having predetermined spectral properties of reflection which correspond to each of the three primary color beams, said reflectors being arranged at different angles to an optical axis of the light from said light source and reflecting the polarized components of the three primary color beams passing through said polarization converting element.

15. A color projection liquid crystal display as claimed in claim 14, wherein said polarization converting element comprises an optical retardation plate.

16. A color projection liquid crystal display as claimed in claim 11, further comprising a microlens array attached to said liquid crystal panel in order to focus the three primary color beams onto predetermined pixels of the liquid crystal panel which correspond to the three primary colors.

17. A color projection liquid crystal display, comprising:
a light source for emitting light which has a predetermined optical power;
an optical unit located between said light source and said liquid crystal panel, said optical unit processing light from said light source to selectively derive three primary color beams from said light source by a plurality of reflectors, to convert all of the three primary color beams into converted polarized beams which are all formed by either P-polarized beams or S-polarized beams and which have optical power greater than a half of said predetermined optical power, and to thereafter irradiate the liquid crystal panel with said converted polarized beams.

18. A color projection liquid crystal display as claimed in claim 17, wherein the optical power of the converted polarized beams is substantially equal to said predetermined optical power.

* * * * *